United States Patent [19]
Peterson et al.

[11] Patent Number: 5,999,372
[45] Date of Patent: Dec. 7, 1999

[54] ACTUATOR ARM WITH STREAMLINED LEADING EDGE TO REDUCE AIR TURBULENCE

[75] Inventors: Alvin Robert Peterson, Oklahoma City; Carl Fred Adams, Yukon; Robert Thurston Granger, Mustang, all of Okla.

[73] Assignee: Seagate Technology, Inc., Scotts Valley, Calif.

[21] Appl. No.: 09/000,689

[22] Filed: Dec. 30, 1997

[51] Int. Cl.⁶ .............................. G11B 5/48; G11B 21/00
[52] U.S. Cl. ............................................. 360/106; 360/104
[58] Field of Search ................................... 360/104, 106

[56] References Cited

U.S. PATENT DOCUMENTS

| | | | |
|---|---|---|---|
| 4,175,275 | 11/1979 | Schaefer | 360/104 |
| 4,189,759 | 2/1980 | Bauck et al. | 360/104 |
| 5,313,355 | 5/1994 | Hagen | 360/104 |
| 5,404,636 | 4/1995 | Stefansky et al. | 29/603 |
| 5,446,611 | 8/1995 | Webber | 360/104 |

*Primary Examiner*—John H. Wolff
*Attorney, Agent, or Firm*—Crowe & Dunlevy

[57] ABSTRACT

An apparatus and associated method are described which reduce air turbulence in a disc drive assembly. In a method of use, a groove is machined into a side portion of an actuator arm and then a streamlined actuator arm side rail is inserted into the groove to provide streamlining characteristics to the actuator arms. An actuator arm is provided which has a groove which extends along a side portion of the actuator arm. A streamlined side rail is attached to the side portion of the actuator arm, and is preferably arrowhead-shaped so that the side rail mates with the groove. The streamlined side rail reduces air turbulence in the disc drive caused by air flow against and around the actuator arms, yielding an improvement in the power consumption of the disc pack spindle motor.

10 Claims, 4 Drawing Sheets

ACTUATOR ARM WITH STREAMLINED LEADING EDGE TO REDUCE AIR TURBULENCE

RELATED APPLICATIONS

This application is related to copending U.S. patent application Ser. No. 09/000,804 entitled DISC DRIVE ACTUATOR ARM SIDE RAIL AND METHOD OF USE THEREFOR filed concurrently herewith and assigned to the assignee of the present invention.

FIELD OF THE INVENTION

This invention relates generally to the field of disc drive storage devices, and more particularly, but not by way of limitation, to reducing power requirements resulting from air turbulence over and around the actuator arms.

BACKGROUND OF THE INVENTION

Computers commonly use hard disc drives to store large amounts of data in a form that can be readily accessed by a user. A disc drive generally includes a stack of vertically spaced magnetic discs that are rotated at a constant high speed by a spindle motor. The surface of each disc is divided into a series of concentric, radially spaced data tracks in which the data are stored in the form of magnetic flux transitions. Typically, each data track is divided into a number of data sectors that store data blocks of a fixed size.

Data are stored and accessed on the discs by an array of read/write heads ("heads") mounted to a rotary actuator assembly, or "E-block." Typically, the E-block includes a plurality of actuator arms which project outwardly from an actuator body to form a stack of vertically spaced actuator arms. The stacked discs and arms are configured so that the surfaces of the stacked discs are accessible to the heads mounted on the complementary stack of actuator arms.

Head wires included on the E-block conduct electrical signals from the heads to a flex circuit, which in turn conducts the electrical signals to a flex circuit bracket mounted to a disc drive basedeck. For a general discussion of E-block assembly techniques, see U.S. Pat. No. 5,404,636 entitled METHOD OF ASSEMBLING A DISK DRIVE ACTUATOR, issued Apr. 11, 1995 to Stefansky et al., assigned to the assignee of the present invention.

The actuator body pivots about a cartridge bearing assembly which is mounted to the disc drive housing at a position closely adjacent the outer extreme of the discs. The actuator assembly includes a voice coil motor which enables the actuator arms and the heads attached thereto to be rotated about the cartridge bearing assembly so that the arms move in a plane parallel to the surfaces of the discs to selectively position a head over a preselected data track.

The voice coil motor includes a coil mounted radially outwardly from the cartridge bearing assembly, the coil being immersed in the magnetic field of a magnetic circuit of the voice coil motor. The magnetic circuit comprises one or more permanent magnets and magnetically permeable pole pieces. When current is passed through the coil, an electromagnetic field is established which interacts with the magnetic field of the magnetic circuit so that the coil moves in accordance with the well-known Lorentz relationship. As the coil moves, the actuator body pivots about the pivot shaft and the heads move across the disc surfaces.

Each of the heads is mounted to an actuator arm by a flexure which attaches to the end of the actuator arm. Each head includes an interactive element such as a magnetic transducer which either senses the magnetic transitions on a selected data track to read the data stored on the track, or transmits an electrical signal that induces magnetic transitions on the selected data track to write data to the data track. Air currents are caused by the high speed rotation of the discs. A slider assembly included on each head has an air bearing surface which interacts with the air currents to cause the head to fly at a short distance above the data tracks on the disc surface.

There is a generally recognized trend in the industry to decrease the power requirements of modern disc drives. It has been determined that air turbulence within the disc drive creates drag on the discs, thereby having a negative affect on the power requirements of the disc pack spindle motor. Simply stated, the more air turbulence inside the disc drive, the more power it takes to spin the disc pack. Because discs are being turned at ever increasing revolutions per minute, the problem of air turbulence in the disc drive becomes even more significant.

Prior art actuator arms have had blunt leading edges. The air flow caused by the high speed rotation of the discs within the drive runs strikes against the blunt leading edges of the actuator arms, creating turbulence within the drive. This turbulence results in drag on the discs and increased power consumption by the disc pack spindle motor. Thus, there is a need for an improved technique for reducing air turbulence within the disc drive.

The present invention provides a solution to this and other problems, and offers other advantages over the prior art.

SUMMARY OF THE INVENTION

The present invention relates to disc drive actuator arms having a streamlined leading edge portion for reducing turbulence in disc drives.

In accordance with one embodiment of the invention, a method for reducing turbulence in a disc drive is provided which includes the steps of machining a groove into a side portion of the actuator arm and inserting a streamlined side rail into the groove on the side of the actuator arm.

The present invention also provides an improved actuator arm assembly for a disc drive. In a preferred embodiment the actuator arm assembly includes an actuator arm having a side portion which extends along a portion of the actuator arm, and a streamlined side rail attached to the side portion of the actuator arm. In particularly preferred embodiments, the side portion of the actuator arm includes a groove which extends along a portion of the actuator arm and the streamlined side rail is elongated and has a substantially arrowhead-shaped cross-section so that the side rail mates with the groove on the side portion of the actuator arm.

These and various other features as well as advantages which characterize the present invention will be apparent from a reading of the following detailed description and a review of the associated drawings.

DETAILED DESCRIPTION

Figure 1:
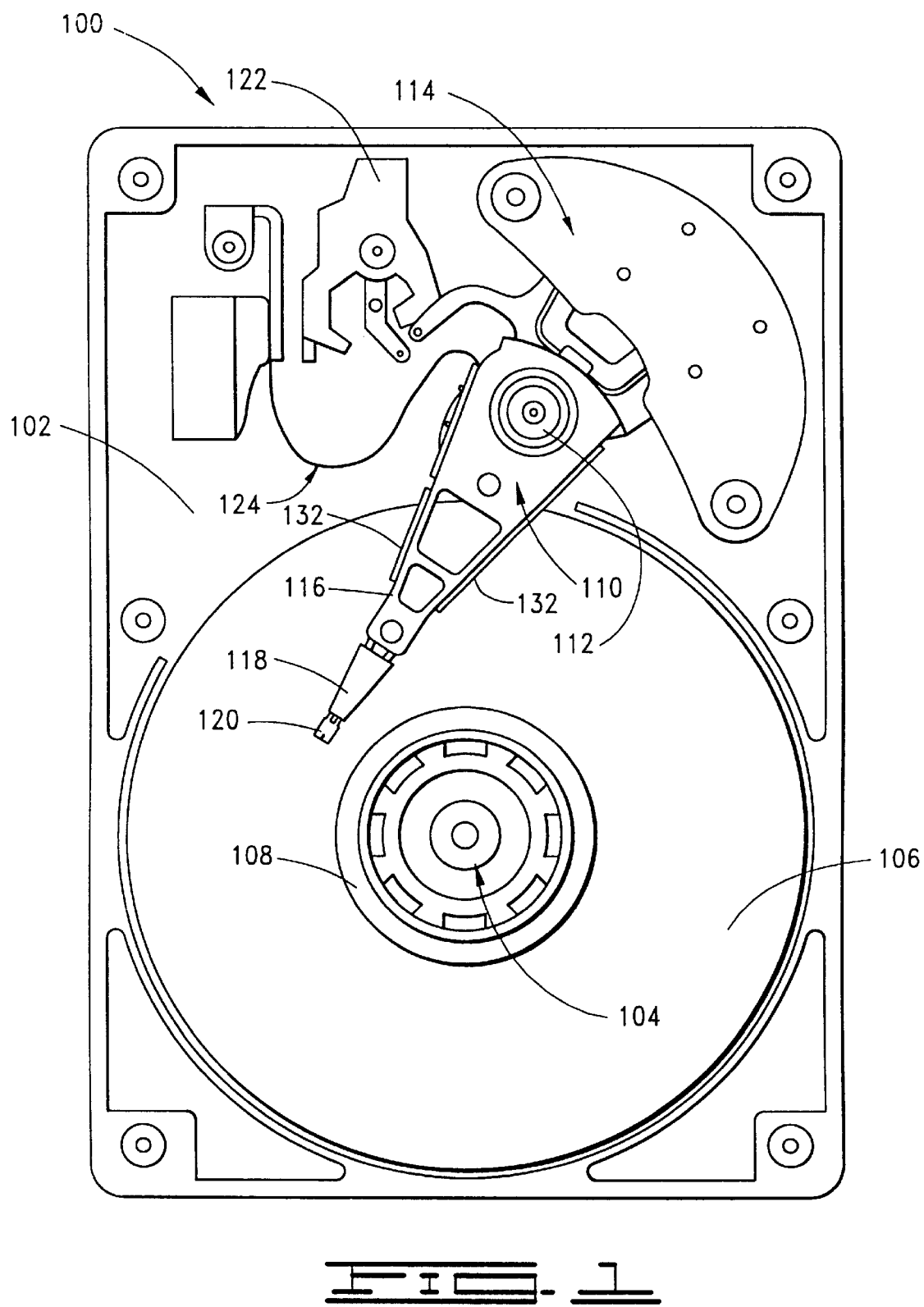
FIG. 1 is a top plan view of a disc drive constructed in accordance with a preferred embodiment of the present invention.

Turning now to the drawings and more particularly to FIG. 1, shown therein is a top plan view of a disc drive 100 constructed in accordance with a preferred embodiment of the present invention. The disc drive 100 includes a base deck 102 to which various components of the disc drive 100 are mounted. A top cover, which has been omitted from FIG. 1 to facilitate the present discussion, cooperates with the base deck 102 to form an internal, sealed environment for the disc drive.

A spindle motor 104 is provided to rotate a stack of discs 106 at a constant high speed. A disc clamp 108 secures the discs 106 to a hub (not separately designated) of the spindle motor 104.

To transfer data to and from the discs 106, a controllably positionable actuator assembly 110 is provided which rotates about a cartridge bearing assembly 112 in response to currents applied to a coil (not separately designated) of a voice coil motor (VCM) 114. The actuator assembly 110 includes a plurality of actuator arms 116 from which corresponding flexure assemblies 118 extend. Heads 120 are provided at distal ends of the flexure assemblies 118 and are supported over the discs 106 by air bearings established by air currents set up by the rotation of the discs 106. A latch assembly 122 is provided to secure the heads 120 over landing zones at the innermost diameters of the discs 106 when the disc drive 100 is deactivated. A flex circuit 124 provides electrical communication paths between the actuator assembly 110 and a disc drive printed circuit board (not shown in FIG. 1) mounted to the underside of the disc drive 100 in a conventional manner.

Figure 2:
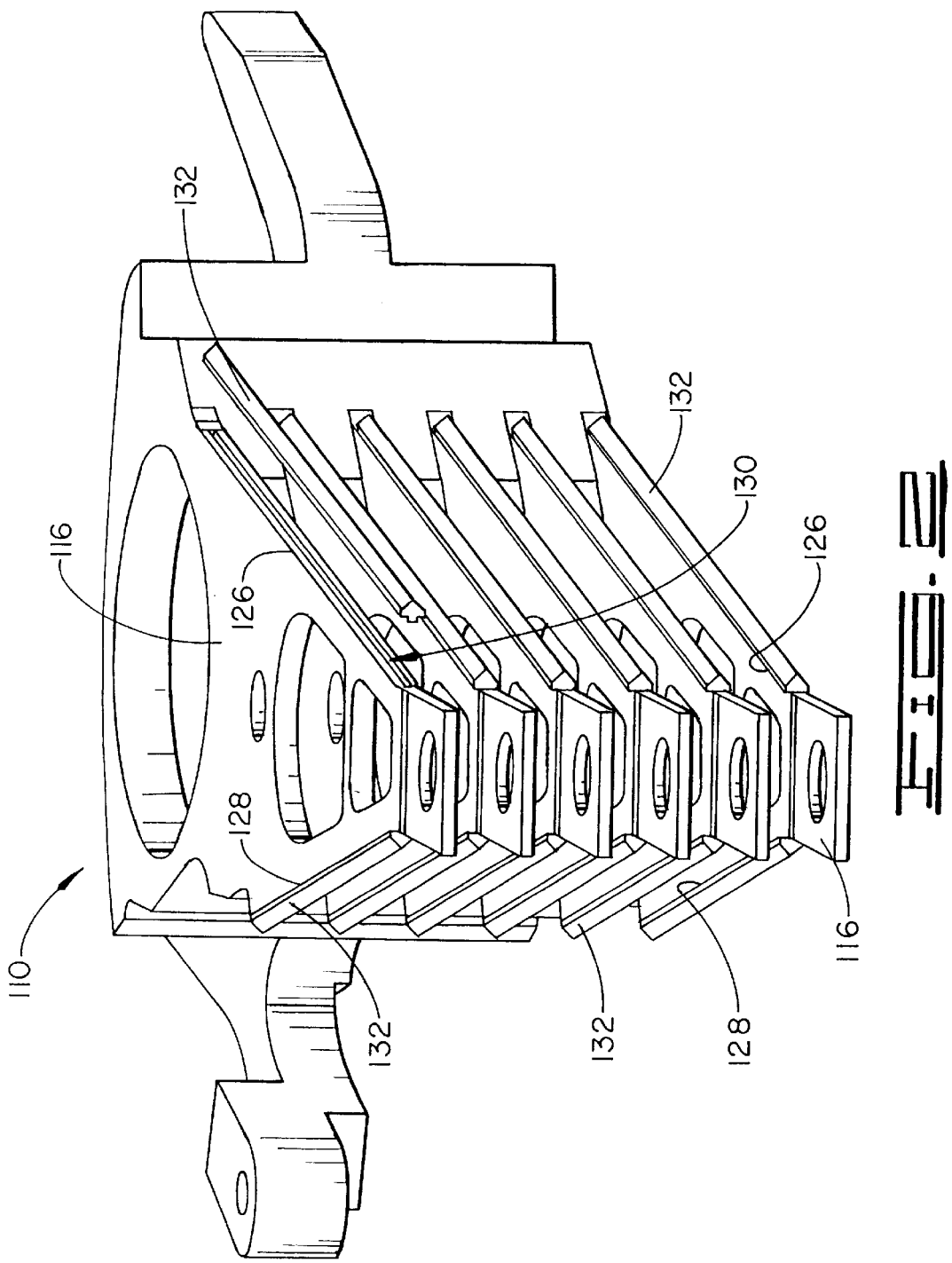
FIG. 2 is a perspective view of an actuator assembly with the heads and flexures removed constructed in accordance with a preferred embodiment of the present invention.

Referring now to FIG. 2, shown therein is a perspective view of the actuator assembly 110 constructed in accordance with a preferred embodiment of the present invention. For the purpose of clarity, certain parts of the actuator assembly 110, such as the flexure assemblies 118 and heads 120, have been omitted from FIG. 2. As shown, each of the actuator arms 116 has two side portions 126, 128, and each of the side portions 126, 128 includes a groove 130 formed therein. The grooves 130 are preferably formed in the side portions 126, 128 by a machining operation.

A streamlined actuator arm side rail 132 (hereinafter referred to as a "streamlined side rail") has a portion thereof disposed within each of the grooves 130. The substantially arrowhead-shaped cross-section of the streamlined side rail 132 provides streamlining properties to the actuator arm 116, thereby reducing air turbulence in the disc drive caused from air flow against and around the actuator arms. Other suitable shapes for the streamlined side rails 132 can alternatively be used in accordance with the present invention, provided that such alternative shapes give streamlining properties to the actuator arms 116. For instance the leading edge of the side rail 132 can be rounded rather than pointed.

Although the streamlined side rails 132 are shown on both side portions 126, 128 of the actuator arms in FIG. 2, persons skilled in the art will recognized that the streamlined side rails may alternatively be placed on only one side of the actuator arms 116. For instance, in an alternative embodiment the streamlined side panels 132 are located on only the leading edge side of the actuator arms 116, that is, on the side of the actuator arms 116 which encounters the force of the air flow created by rotation of the discs 106.

Figure 6:
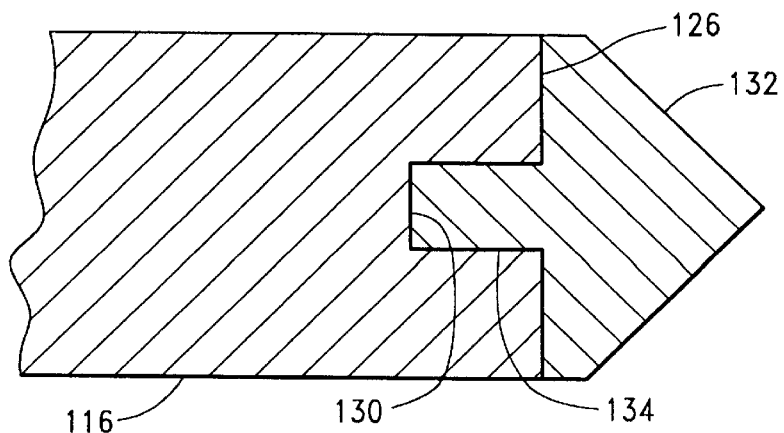
FIG. 6 is a cross-sectional, side view of an actuator arm constructed in accordance with the alternative embodiment of FIG. 3.

Preferably, each streamlined side rail 132 is formed by extruding a selected material into a substantially arrowhead-shaped cross section, as perhaps best shown in FIG. 6. However, persons skilled in the art will recognize that streamlined side rails 132 constructed in accordance with the present invention can be formed in a variety of ways, such as by machining or casting. The streamlined side rails 132 can be formed from a light weight composite material, such as a carbon fiber composite, or from any other suitable material.

As shown in FIG. 6, a portion of each streamlined side rail 132 forms an appendage or tongue 134 which mates with the corresponding groove 130 in a tongue and groove relationship. The streamlined side rails 132 can be fixedly attached to the side portions 126, 128 of the actuator arms 116 such as by using a suitable adhesive. Alternatively, the appendage 134 on the streamlined side rails 132 can be appropriately shaped to provide a locking engagement with the groove. For instance, the appendage 134 can be slightly thicker (not shown) at its distal end than at its proximal end, allowing the appendage 134 to "snap" into engagement with the groove 130. In another embodiment, the appendage 134 includes a detent or bulbous portion (not shown) at its proximal end which allows the streamlined side rail 130 to similarly snap into engagement with the groove 130. Other suitable shapes for the appendage 134 and groove 130 will be readily recognized by those skilled in the art, all of which are within the spirit and scope of the present invention.

Although the streamlining of the actuator arms 116 in the preferred embodiment is created by using a side rail 132, it will be recognized that the streamlined edge of the actuator arms 116 can be integrally formed on the actuator arms, such as by an extruding process.

Figure 3:
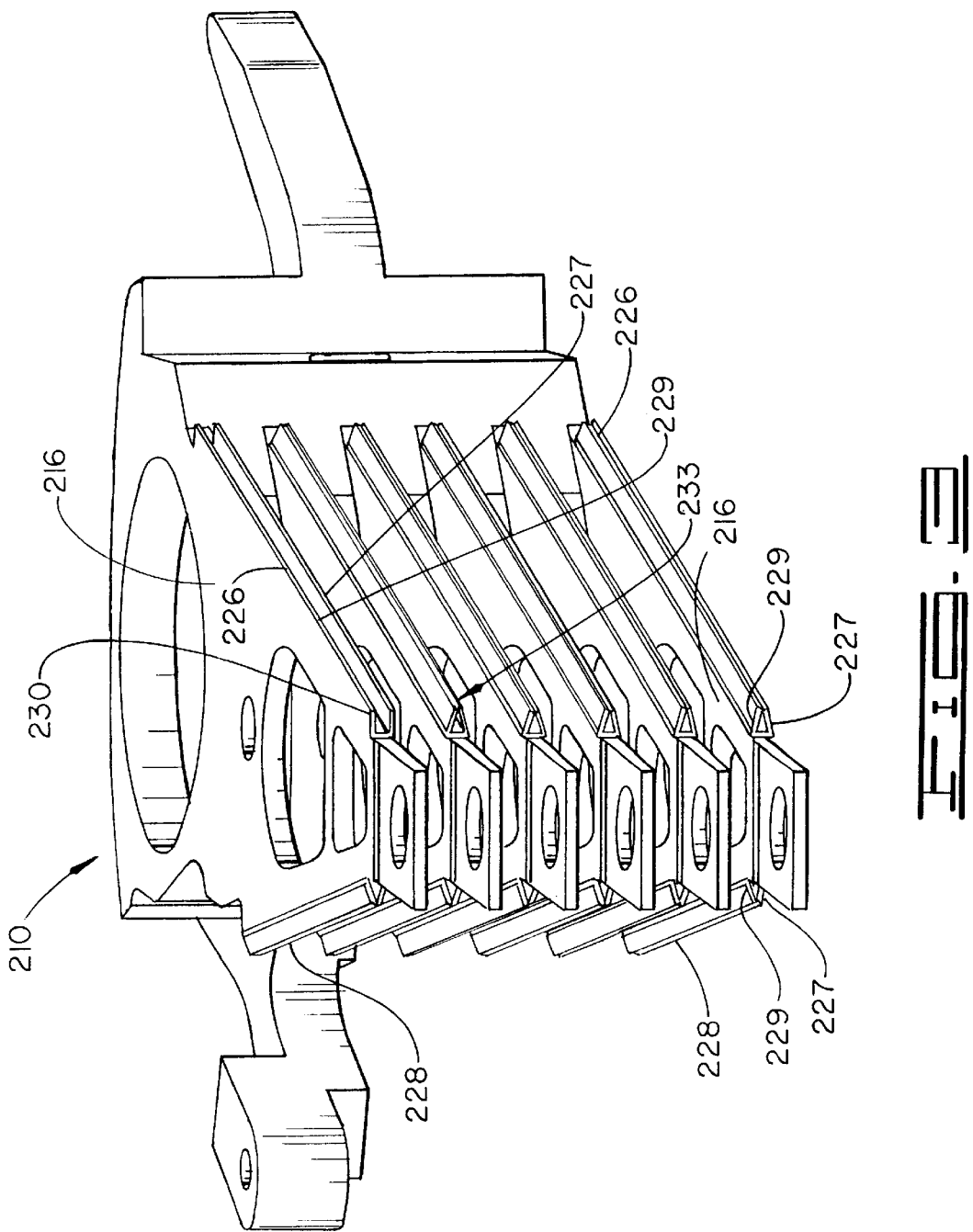
FIG. 3 is a perspective view of an actuator assembly with the heads and flexures removed constructed in accordance with an alternative embodiment of the present invention.

Referring now to FIG. 3, shown therein is a perspective view of the actuator assembly 210 constructed in accordance with an alternative embodiment of the present invention. For the purpose of clarity, certain parts of the actuator assembly 210, such as the flexure assemblies 118 and heads 120, have been omitted from FIG. 3. As shown, each of the actuator arms 216 has two side portions 226, 228, and each of the side portions 226, 228 includes a pair of thin fingers 227, 229 which are bent toward one another until they touch, as shown at 231. As a result, each of the side portions 226, 228 of the actuator arms 216 take on a wedge shape 233, yielding streamlining characteristics.

Figure 4:
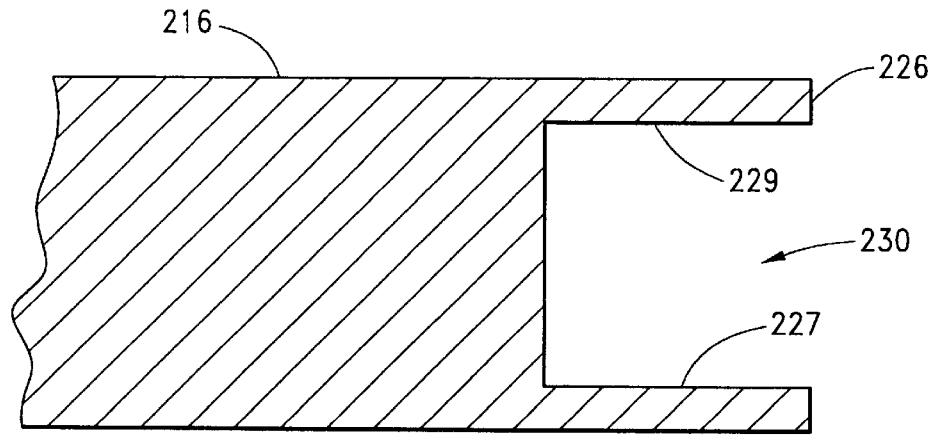
FIG. 4 is a cross-sectional, side view of an actuator arm constructed in accordance with the preferred embodiment of FIG. 2.
Figure 5:
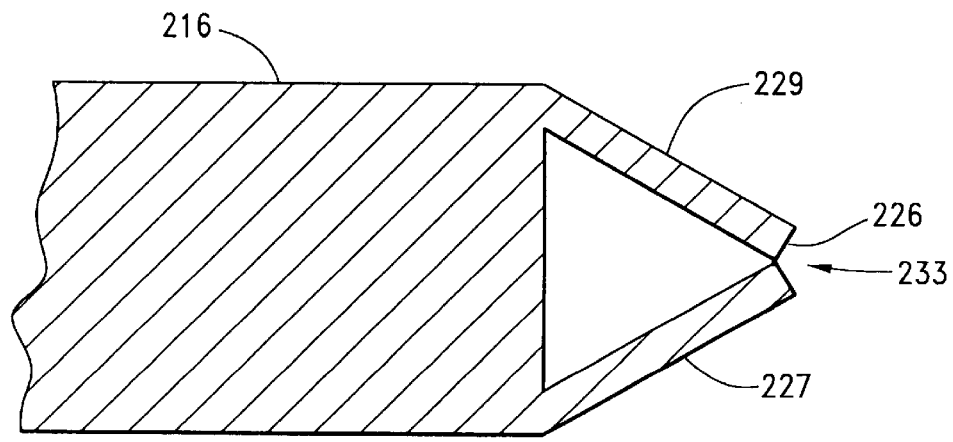
FIG. 5 is a cross-sectional, side view of an actuator arm having a groove machined therein in accordance with the alternative embodiment of FIG. 3.

The fingers 227, 229 are preferably formed by machining a groove 230 into the side portions 226, 228 of the actuator arms 216 (FIG. 4) and then bending the resulting fingers 227, 229 together at their outer ends (FIG. 5) to yield a streamlined wedge shape 233. In FIGS. 3 and 4, the fingers 227, 229 on the side portion 226 of the top actuator arm 216 are shown unbent to illustrate the groove 230 and the method of forming the fingers 227, 229. The grooves 230 are preferably formed in the side portions 226, 228 by a machining operation and are initially formed somewhat wider and deeper than the grooves 130 of FIG. 2 described above.

Accordingly, in view of the foregoing discussion it will be clearly understood that the present invention is directed to an apparatus and method for minimizing air turbulence in a disc drive (such as 100) resulting from air flow into and around the actuator arms (such as 116, 216). The apparatus includes an actuator arm (such as 116, 216) having a side portion (such as 126, 128, 226, or 228) which has a streamlined shape (such as 132, 233) on the side portion. The streamlined shape of the side portion provides streamlining properties to the actuator arms, decreasing air turbulence in the disc drive and the resulting improvement in air drag will provide a corresponding decrease in the power requirements of the disc pack spindle motor. The decrease in air turbulence in the disc drive may improve the flight characteristics of the head and flexure, as well.

It will be clear that the present invention is well adapted to attain the ends and advantages mentioned as well as those inherent therein. While presently preferred embodiments have been described for purposes of disclosure, numerous changes may be made which will readily suggest themselves to those skilled in the art and which are encompassed in the spirit of the invention disclosed and as defined in the appended claims.

What is claimed is:

1. An actuator assembly in a disc drive having a single, rigid rotatable disc with a recording surface, the actuator assembly comprising:

a rigid actuator arm having a first end adjacent a pivot axis and a second end mechanically coupled to a flexure assembly which in turn supports a read/write head, wherein the actuator arm extends over the surface and controllably moves the head across the surface, the actuator arm having a streamlined leading edge portion extending between the first and second ends which diverts air currents set up by rotation of the disc above and below remaining portions of the actuator arm to reduce turbulence in the air currents, the leading edge portion tapering to a reduced cross-sectional area with respect to the remaining portions of the actuator arm, with the air currents initially impinging upon the reduced cross-sectional area.

2. The actuator assembly of claim 1, wherein the disc drive comprises at least one additional rigid rotatable disc with a corresponding magnetic recording surface.

3. The actuator assembly of claim 2, wherein the streamlined leading edge portion is elongated and has a substantially arrowhead-shaped cross section.

4. The actuator assembly of claim 2, wherein the streamlined leading edge portion is formed by a process comprising steps of:

(a) machining a groove along a length of the actuator arm between the first and second ends; and (b) inserting a streamlined side rail into the groove to form the streamlined leading edge portion.

5. The actuator assembly of claim 2, wherein the streamlined leading edge portion is formed by a process comprising steps of:

(a) machining a groove along a length of the actuator arm to produce an upper lip and a lower lip on either side of the groove, wherein the upper and lower lips each have a distal end; and (b) bending the upper and lower lips to bring the respective distal ends into substantial mutual contact to form the reduced cross-sectional area.

6. A disc drive assembly, comprising:

a base deck;

a spindle motor mounted to the base deck and having a central axis;

a rigid disc mounted to the spindle motor for rotation about the central axis, the disc having a recording surface; and an actuator assembly mounted to the base deck adjacent the disc and having an actuator axis parallel to the central axis about which the actuator assembly is controllably rotatable, wherein the actuator assembly comprises:

a read/write head;

a flexure assembly coupled to the head; and an actuator arm extendable over the surface to controllably position the head adjacent the surface, the actuator arm having a first end adjacent the actuator axis and a second end mechanically coupled to the flexure assembly, the actuator arm comprising a streamlined leading edge portion extending between the first and second ends which diverts air currents set up by rotation of the disc above and below remaining portions of the actuator arm to reduce turbulence in the air currents, the leading edge portion tapering to a reduced cross-sectional area with respect to the remaining portions of the actuator arm with the air currents initially impinging upon the reduced cross-sectional area.

7. The disc drive assembly of claim 6, wherein the streamlined leading edge portion of the actuator arm is formed by steps of:

(a) machining a groove along a length of the actuator arm between the first and second ends; and (b) inserting a streamlined side rail into the groove on the side portion of the actuator arm.

8. The disc drive assembly of claim 7, wherein the streamlined rail is elongated and has a substantially arrowhead-shaped cross section.

9. A method of reducing turbulence in a disc drive assembly comprising a rigid, rotatable disc with a recording surface and an actuator assembly having an actuator arm which extends over the surface to support a head adjacent the surface, the actuator arm having a first end proximate an actuator axis and a second end coupled to the head, the method comprising steps of:

(a) machining a groove along a length of the actuator arm between the first and second ends; and (b) inserting a streamlined side rail into the groove, wherein the streamlined side rail diverts air currents set up by rotation of the disc above and below remaining portions of the actuator arm to reduce turbulence in the air currents, the streamlined side rail tapering to a reduced cross-sectional area with respect to the remaining portions of the actuator arm with the air currents initially impinging upon the reduced cross-sectional area.

10. The method of claim 9, wherein the streamlined side rail is formed in an elongated shape which has a substantially arrowhead-shaped cross section.

* * * * *